Aug. 16, 1955

MASARU IBUKA ET AL

MAGNETIC HEADS FOR MAGNETIC RECORDING
AND REPRODUCING APPARATUS

Filed Sept. 19, 1951

2,715,659

INVENTOR.
MASARU IBUKA
KAZUO IWAMA
BY
Haseltine, Lake & Co.
AGENTS

United States Patent Office 2,715,659

Patented Aug. 16, 1955

2,715,659

MAGNETIC HEADS FOR MAGNETIC RECORDING AND REPRODUCING APPARATUS

Masaru Ibuka, Shibuya-ku, Tokyo, and Kazuo Iwama, Shinagawa-ku, Tokyo, Japan

Application September 19, 1951, Serial No. 247,232

Claims priority, application Japan October 14, 1950

1 Claim. (Cl. 179—100.2)

This invention relates to an improved magnetic head for magnetic recording and reproducing apparatus, and more particularly to a magnetic head which is provided with a moulded core member and is well adapted for an erasing head and the like of such magnetic recording and reproducing.

The object of this invention is to obtain a magnetic head which can easily be manufactured and operated at high efficiency owing to its low wattles heat consumption based upon eddy current.

It has been considered that a magnetic head such as an erasing head of a magnetic recording apparatus needs a magnetic core member having high permeability in order to obtain high efficiency. At this point of view, the core member of such kinds has heretofore been constructed by laminating a plurality of sheets having especially high permeability in a desired form. In fact, such a magnetic core member is relatively small in size and complicate in shape and accordingly the laminating operation is very troublesome.

In accordance with this invention, we propose a moulded core member which may be manufactured, at a single stroke, by means of sintering in which powder of magnetic material is pressed in a mould at a suitable temperature to form any required shape. Thereafter a coil is wound on the moulded core member.

Figure 1:
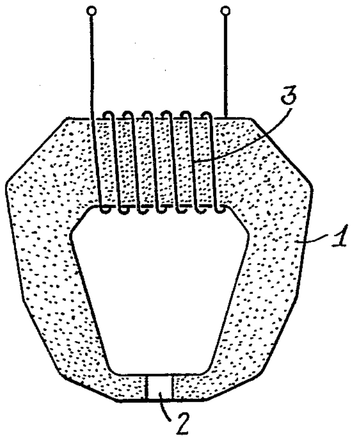
Figure 2:
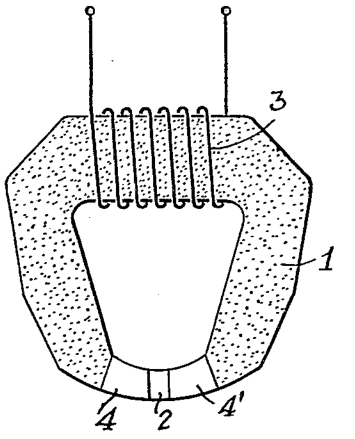

This invention will be more clearly understood by reference to the attached drawings wherein Fig. 1 is a diagrammatic view for illustrating one embodiment of this invention and Fig. 2 a similar view of a modified construction of this invention.

Referring to the drawing: 1 represents a core member which is manufactured by heating and pressing powder of Permalloy as for example in a mould according to this invention. The core member 1 is substantially loop-shaped and has a thickened portion opposite a thin portion. The thin portion is divided into spaced ends by an intervening gap. In moulding a spacer 2 of non-magnetic material is preferably buried in the gap between two polar ends of the thin portion of the moulded core member 1. 3 is a coil wound on the moulded core member 1 by any suitable process well known in the art. The thickened portion and thin portion of the core member are homogeneously pressed to shape.

As seen from the above description a single body consisting of the core member 1 and spacer 2 can easily and simply be obtained under mass production so that the magnetic heads of the same characteristics can also be manufactured at low cost.

Fig. 2 shows another embodiment of this invention in which a pair of pole pieces 4 and 4' of magnetic material such as Permalloy can be attached to both ends of the thin portion of the moulded core member 1 so as to effectively concentrate magnetic flux to the pole pieces, the spacer 2 being disposed therebetween.

In the art of magnetic recording and reproducing, frequencies applied to such magnetic heads will usually be ranged from low frequency of about 20 cycles per second to high frequency of 100 kilo-cycles or more. A heretofore known erasing head for example, when energized by current of such a higher range of frequencies, will produce so much heat quantity as its eddy current loss that a paper tape to which recording medium is put, might be scorched, if the tape is stopped at standing state for a little while. But in case of using an erasing head according to this invention such a fear is never experienced.

Experiments which are made in connection with erasing efficiency shows that a signal which is recorded by a current of 1000 cycles per second at 0 db still remains as a noise level of —40 db after erasure by an erasing head which is usually provided with a laminated sheet iron core. The similar signal, on the contrary, can be reduced to a noise level of —55 db, when the similar experiments, under the same conditions, are carried out by an erasing head according to this invention.

It is also found that a magnetic head comprising a moulded core member which is made by means of sintering, even in case of using powder of magnetic material having relatively low permeability, is far excellent if compared with a magnetic head heretofore known, which is provided with an ordinary laminated sheet iron core of higher permeability. This is because of the fact that the moulded core member according to this invention can operate without accompanying so much wattless heat consumption based upon eddy current and accordingly a greater part of electric power served to the moulded core member can be effectively consumed thereby.

Though the above description has mainly been taken with regard to the erasing head, it is matter of course that magnetic heads according to this invention can not only be used as erasing heads but also as recording or reproducing heads with the result of good efficiency and superior characteristics.

It is to be understood that this invention is not limited to any specific construction disclosed therein or otherwise than by the appended claim.

What is claimed is:

A magnetic head for a magnetic recording and reproducing apparatus, comprising a pressed loop-shaped core member of powdered magnetic material, said core member having a thick portion and a thin portion homogeneously pressed into shape and arranged opposite one another, said thin portion being divided into spaced ends by a gap, a coil wound on said thick portion, a spacer of non-magnetic material disposed in said gap, and pole pieces of magnetic material such as Permalloy extended from opposite sides of said spacer and extended into the ends of said thin portion to effectively concentrate magnetic flux to the pole pieces.

References Cited in the file of this patent

UNITED STATES PATENTS

| | | |
|---|---|---|
| 2,361,752 | Eilenberger | Oct. 31, 1944 |
| 2,361,753 | Eilenberger | Oct. 31, 1944 |
| 2,594,414 | Garreau | Apr. 29, 1952 |